UNITED STATES PATENT OFFICE.

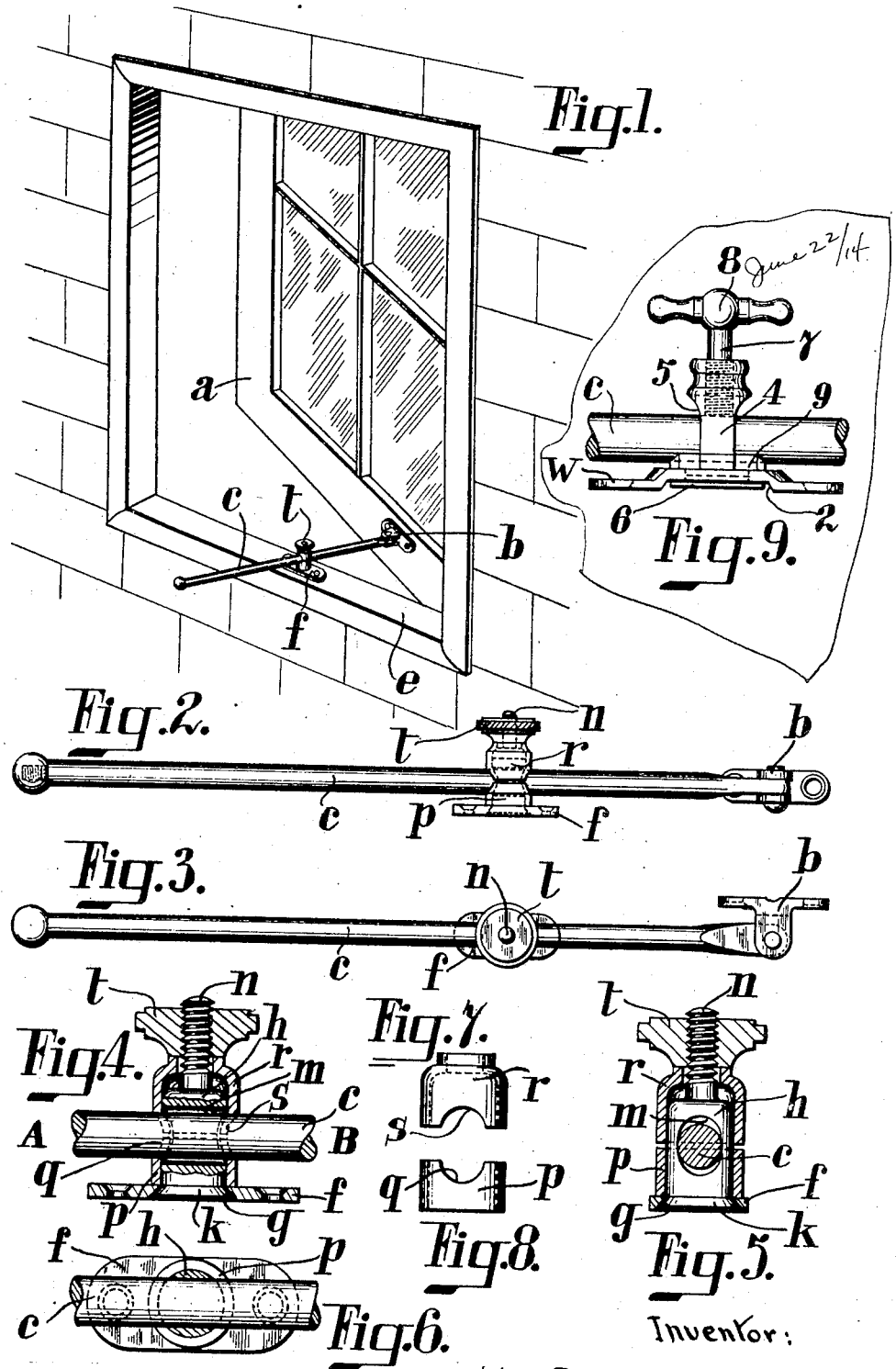

JOHN REGINALD BROWN, OF BRIGHTON, ENGLAND.

CLAMPING DEVICE FOR USE WITH RODS AND THE LIKE.

1,125,953.

Specification of Letters Patent. Patented Jan. 26, 1915.

Application filed October 29, 1913. Serial No. 797,934.

*To all whom it may concern:*

Be it known that I, JOHN REGINALD BROWN, a subject of the King of England, residing at 9 Melville road, Brighton, in the county of Sussex, England, ironmonger's assistant, have invented certain new and useful Improvements in Clamping Devices for Use with Rods and the like, of which the following is a specification.

This invention relates to an improved clamping device for use with rods and the like which device permits the rod to be slid with respect thereto, to be turned in any direction with respect to the axis of the device and to be clamped in any required position.

The device is more particularly applicable for use for locking the stays of casement and other windows, but may also be adapted for other purposes.

The device comprises a base plate or its equivalent carrying a member rotatable with respect thereto in or through which member the rod or the like to be clamped slides, and a screw or other equivalent means adapted to prevent the rod sliding with respect to the device and also to prevent the rotatable portion of the device rotating with respect to the base plate.

In the preferred method of applying my invention to a clamp for a casement stay I provide a base plate which is adapted to be attached by screws or the like to the casement frame. This base plate is furnished with a central hole having a downwardly beveled or conical edge. I also provide a bolt having a taper head adapted to fit within the conical hole just mentioned and having in the shank an elongated hole of sufficient size for the casement stay to pass through. The said bolt is reduced and provided at the top with a screw threaded portion for the reception of a milled nut or the like. Adapted to fit over the bolt is a collar furnished with a substantially semi-circular groove, adapted to receive the lower half of the casement stay and another collar is provided with a similar substantially semi-circular groove adapted to fit over the upper portion of the casement stay. The milled nut or the like is screwed on to the screw threaded portion of the bolt and bears upon the uppermost collar.

It will be seen that when the milled nut is loosened the casement stay can be slid longitudinally and as the casement opens or closes the part of the device through which the stay passes is enabled to turn with respect to the base plate, thus accommodating itself to the position of the stay. When the casement is in the correct position the milled nut is screwed home which causes the two collars to clamp the stay tightly between them and prevent its longitudinal movement and at the same time pulls the head of the bolt upward so that it engages tightly in the conical hole, thus preventing its rotation.

In order that my said invention may be better understood, I will now proceed to described the same with reference to the drawing accompanying this specification in which:—

Figure 1 is a perspective view of a casement with my invention applied thereto; Fig. 2 is an enlarged side elevation of the casement stay and clamping device; Fig. 3 is a plan of same; Fig. 4 is an enlarged section of the device; Fig. 5 is another section at right angles to the section at Fig. 4. Fig. 6 is a section on the line A B Fig. 4. Figs. 7 and 8 are details hereinafter referred to.

In the drawing $a$ is the frame of a casement window to which is attached the ordinary swivel bracket $b$, to which the stay $c$ is pivoted. Attached to the casement frame $e$ is the clamping device constituting the subject matter of the invention. This comprises a base plate $f$ provided with screw holes for attaching it to the casement frame $e$ and having a central hole provided with a beveled or conical edge $g$.

$h$ is a bolt provided with a conical head $k$, of such size as to fit within the conical hole $g$, and furnished with an elongated slot $m$ of sufficient size to enable the casement stay $c$ to slide easily therethrough. The bolt is reduced at the top and provided with a screw threaded portion $n$.

$p$ is a circular collar, provided with grooves $q$ diametrically opposite one another in its walls, such grooves being slightly less than a semi-circle. $r$ is another collar shown detached at Fig. 7 and also furnished with a similar groove $s$ in diametrically opposite positions. This collar $r$ is reduced at the top and provided with a plain hole adapted to come loosely around the screw $n$. $t$ is a milled nut adapted to screw on to such screw $n$ and bear upon the top of the collar $r$.

It will be seen that when the milled nut $t$ is screwed home it causes the screw $n$ to be pulled upward exerting an upward pull upon the bolt $h$. This causes the head $k$ to come into tight contact with the conical hole $g$, thus preventing the rotation of the bolt with respect to the base plate $f$. At the same time the milled nut presses the upper collar downward and causes the stay $c$ to be clamped between the grooved portions in such collar and in the lower collar $p$, thus preventing any longitudinal sliding movement of the said stay. As soon as the milled nut is loosened the bolt is enabled to rotate upon its axis and the stay can also slide between the loosened groove portions of the collars.

It will be seen that when the clamping screw is screwed home, it presses on the upper surface of the casement stay and binds it tightly against any sliding action. At the same time an upward pull is exerted upon the part 4 causing the head or disk 6 to bind against the under surface of the recessed portion of the base plate, thus preventing any rotation of the part about its own axis.

It will be understood that the saddle piece 9 can be dispensed with if desired, especially in the case where the casement stay is of rectangular section. In other cases an upper saddle piece may be furnished or both an upper and a lower piece.

As previously remarked the device may be adapted for other purposes besides locking the stays of casement windows. It is also to be understood that the particular methods of constructing the device according to my invention described in detail are given merely by way of example as the construction may be varied considerably to adapt the device to various uses, without departing from the principle of my invention.

What I claim and desire to secure by Letters Patent of the United States of America is:—

1. In a device of the class described, a casement rod or stay, locking means for preventing the longitudinal movement of said stay, comprising a collar adapted to fit the lower portion of the casement rod, a second collar adapted to fit said rod above the first collar, a bolt extending through both collars, and a nut threaded upon said bolt and adapted to bind said collars upon the rod.

2. A device of the class described, comprising a base plate having a perforation therein provided with a downwardly beveled or conical edge, a bolt having a tapered head adapted to fit within the conical hole in said base plate, said bolt provided with an elongated slot for the reception of a stay-rod, a reduced threaded portion on said bolt, a collar formed with diametrically opposite grooves and adapted to fit upon the bolt, a second collar also provided with diametrically opposed grooves and adapted to fit on said bolt above the first collar, and a milled nut or suitable means threaded upon said bolt and adapted to clamp said collar upon the stay-rod.

In testimony whereof I affix my signature in presence of two witnesses.

JOHN REGINALD BROWN.

Witnesses:
LILY SIMMONDS,
A. BROWNE.